(12) United States Patent
LeGault et al.

(10) Patent No.: US 10,691,682 B2
(45) Date of Patent: Jun. 23, 2020

(54) STORING AND PROCESSING JSON DOCUMENTS IN A SQL DATABASE TABLE

(71) Applicant: Dell Products LP, Round Rock, TX (US)

(72) Inventors: Collin LeGault, Los Gatos, CA (US); Vinay Sawal, Fremont, CA (US); Bruce Amberden, Pleasanton, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 307 days.

(21) Appl. No.: 15/724,457

(22) Filed: Oct. 4, 2017

(65) Prior Publication Data

US 2019/0102389 A1    Apr. 4, 2019

(51) Int. Cl.
*G06F 16/00* (2019.01)
*G06F 16/242* (2019.01)
*G06F 16/22* (2019.01)
*G06F 16/28* (2019.01)

(52) U.S. Cl.
CPC .......... *G06F 16/2438* (2019.01); *G06F 16/22* (2019.01); *G06F 16/221* (2019.01); *G06F 16/2246* (2019.01); *G06F 16/282* (2019.01)

(58) Field of Classification Search
CPC .................................................. G06F 16/2438
See application file for complete search history.

(56) References Cited

U.S. PATENT DOCUMENTS

2016/0321375 A1*    11/2016    Liu ........................ G06F 16/81

* cited by examiner

*Primary Examiner* — Ajith Jacob
(74) *Attorney, Agent, or Firm* — Staniford Tomita LLP

(57) ABSTRACT

Embodiments for storing a JSON document tree in a single SQL database table by defining a schema to store JSON nodes in the table and converting each JSON document into a corresponding set of rows in the table using the schema to encode a hierarchical relationship of nodes and sub-nodes into a path that specifies a node path to a root node for each node. Embodiments further receiving a SQL query to retrieve a specific sub-document, responding to the query by returning all rows of the table belonging to the sub-document, and inflating the returned rows back into a JSON expression using the path to guide reconstruction of the original JSON document tree.

19 Claims, 7 Drawing Sheets

STORING AND PROCESSING JSON DOCUMENTS IN A SQL DATABASE TABLE

TECHNICAL FIELD

Embodiments are generally directed to a wide scale range of databases and data processing, and more specifically to storing JSON (JavaScript Object Notation) documents in a SQL (Structured Query Language) database table.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Databases are generally divided into two main types: relational or SQL databases that are schema-based, and non-relational or NoSQL databases that are schema-less. Relational databases are structured and data is defined and stored as related entities with attributes across tables (i.e. schemas), thus requiring structures (e.g. tables) to be defined in order to contain and work with the data. Different relational database management systems implement different data types. Some common open source RDBMS (relational database management systems) include: SQLite3, which is an embedded open source relational database management system; MySQL/MariaDB, which is a popular and commonly used open source RDBMS; and PostgreSQL, which is an ANSII SQL-compliant and open source objective-RDBMS; and Oracle, which is a popular and commonly used commercial RDBMS.

Compared to relational databases, non-relational databases are document-oriented and often distributed. NoSQL databases and management systems are schema-less and are not based on a single model (e.g. relational model of RDBMSs) so each database can adopt a different model, depending on its target-functionality. There are a few different operational models and functioning systems for NoSQL databases, such as key/value-based, column-family-based, document-based, and graph-based. Popular NoSQL databases currently include MongoDB, which is a popular document-oriented database, Oracle NoSQL, and Cassandra DB.

NoSQL databases generally offer the benefits of scalability and easy expansion, suitability for big data applications, and ready usage of low-cost hardware platforms. However, the NoSQL database environment is relatively immature compared to the RDBMS world. Modern SQL databases benefit from many years of development and optimization, and offer high performance and availability on virtually every common computer platform. Most critical data processing applications, therefore, use SQL RDBMS databases as part of an overall data processing system. In such applications, many different client devices may source data that represent different data types and that perform different functional operations. In such a case, each data module that accesses a database table may be implemented in upwards of a thousand lines of code. In an example where there are tens to hundreds of different database tables, hundreds of thousands of lines of code may be involved, requiring a significant investment in programming, debugging, and maintenance resources. Managing such a system requires a mechanism where the growth of data types, and thus an increase in the number of database tables, does not exponentially grow the development effort.

Although the use of NoSQL databases is seen as one way of overcoming this challenge, one of the major disadvantages of NoSQL databases is that all data operations and management functions reside in the application code, and any changes to the data requires changes to the application code, and global changes to the data saved in the NoSQL database. In addition, it is very difficult to go into a set of NoSQL document data and perform focused queries to extract specific information. Thus, NoSQL databases are profoundly limited in their ability to manage these applications. For example, key-store databases, such as Redis, can only store JSON documents as single bodies of text (a "text blob"). Complex sub-queries into a text body is not supported, and any query code will need to re-parse the entire JSON text body to be used. Similarly, document-store databases, like MongoDB, require custom query functions to retrieve each different kind of JSON document and data. Any changes to JSON document layouts will break the query functions, thus requiring extensive rewrites of application code.

What is needed, therefore, is a way to reduce the programming overhead of working with data in SQL databases. What is further needed is a way to provide efficient query processing for documents and files in large-scale databases, and in a manner that works on all JSON documents and does not change when documents layouts may change.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
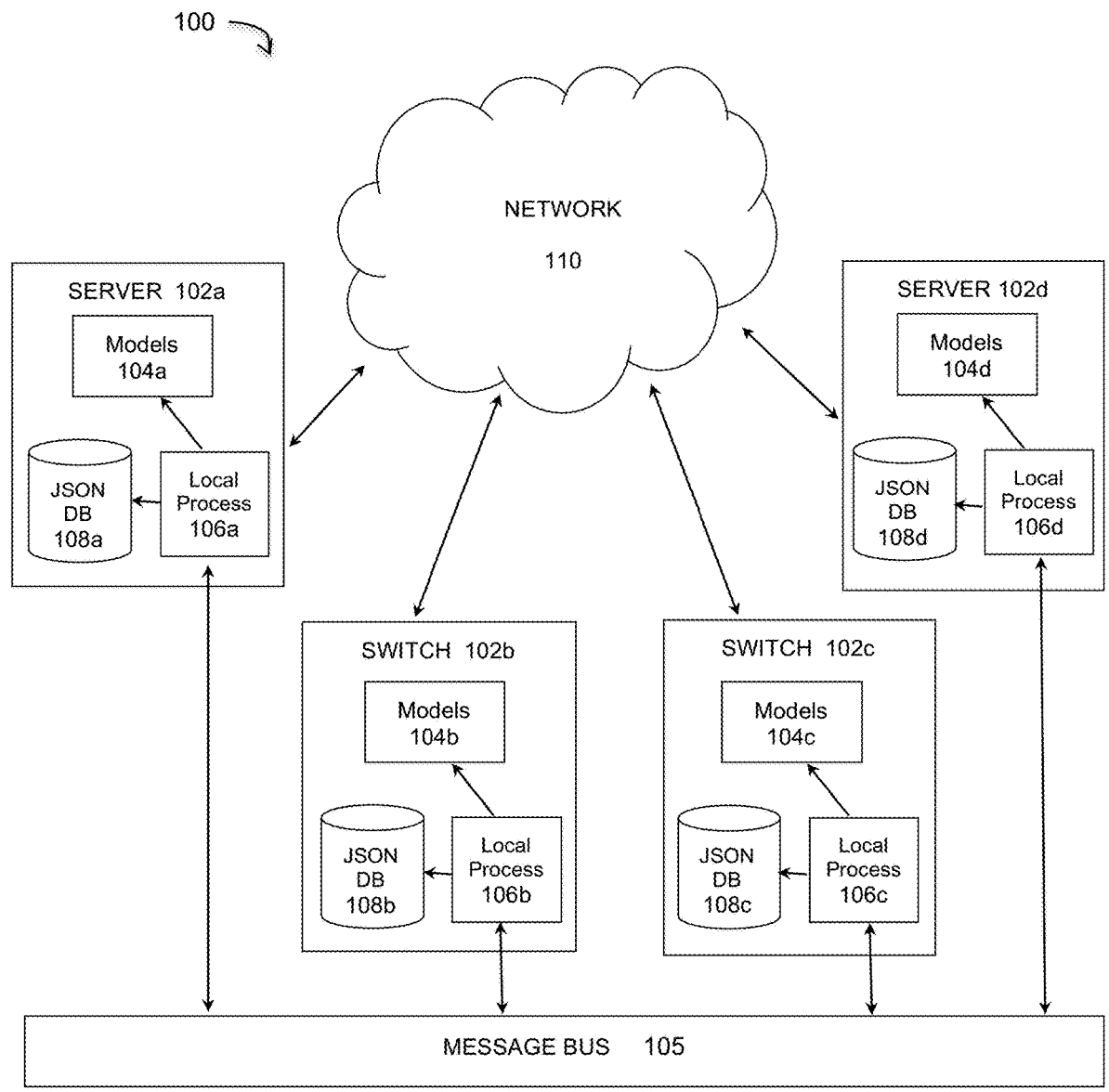
FIG. 1 illustrates a large-scale network system with devices that implement one or more embodiments of a natural language translation interface and process, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Disclosed herein are methods and systems of storing JSON data in an SQL database to reduce the multiple tables required in the traditional database schema to just a single or minimal number of tables. This likewise greatly reduces the lines of programming code by orders of magnitude, while maintaining full system functionality. FIG. 1 illustrates a computer network that implements a SQL database processing system storing JSON document data for networked devices, under some embodiments. System 100 comprises a large-scale network that includes a number of different devices, such as server computers 102*a* and 102*d* and switches 102*b* and 102*c*. These devices are coupled to a central network 110, which may be a WAN, LAN, cloud, or other type of network. The devices are also coupled to each other through a message bus 105.

In an embodiment, the elements of system 100 execute application program(s) to perform distributed network operations. In this embodiment, the collection of switches and servers cooperate to manage the operation of a network. Each network element sources or generates data, which is processed and stored in the system by one or more computers and storage devices. A generalized application may involve network traffic control in which the system operates like an autonomous traffic control system. A system controller watches the traffic and builds models of traffic behavior, and applies user-defined policies combined with traffic models to operate a network. It defines a shared watchdog process to monitor the health of the traffic, the system and all of its parts, and monitors traffic in real-time, compares real-time traffic with traffic models, and takes appropriate action as required. It also sets and manages the configuration and state of all member servers and switches, and new servers and switches are automatically configured and provisioned. The system may also be configured to present users with a dashboard to advise on on-going operations and provide alerts for certain issues.

For the embodiment of FIG. 1, each server and switch element of system 100 consists of a local process 106*a-d* that accesses models 104*a-d* and stores data in a respective JSON database 108*a-d*. It should be noted that, as used herein, a reference number such as 102 may refer to all or any of elements 102*a-d*. For system 100, there may be any practical mix of any number of servers and switches. Switches depend on network fabric topology and network objectives, and servers depend on performance needed to process of fraction of traffic in real-time. Traffic models and algorithms are used to select important traffic for processing. Models 104 implement a hierarchical control and processing structure. In an embodiment, all models and processes are defined in JSON documents saved in the JSON database 108.

In system 100, each server/switch 102 has a local process 106 with an in-memory JSON database 108 that stores model processes 104. Models are JSON documents loaded on demand from the JSON database and run in a worker process by the local process. The model processes perform data processing and analytics, situation recognition, and control actions. The models and local process may, together or separately, be referred to as or embodied in an "application" or executable program module. For each device, the model processes read/write to the JSON database on demand. The local process 106 interfaces to a respective JSON database 108, the message bus 105, and other server/ switch resources. The local process 106 accesses both local and remote JSON database resources. Remote access is provided via the message bus.

FIG. 1 shows only some possible components of system 100, and many other network resources or elements may also be provided, such as networked appliances, storage devices, bridges, routers, WAN/LAN/WiFi interfaces, and other similar devices or computing resources. Likewise, network 110 that itself contains a number of different computing resources (e.g., computers, interface devices, and so on). FIG. 1 is intended to be an example of a representative system implementing a database management process under some embodiments, and many other topographies and combinations of network elements are also possible.

With regard to storing and querying JSON documents in a SQL Table, in an embodiment, the local process 106 in each device 102 uses SQLite3 (or similar) in-process, in-memory database to implement a JSON database. SQLite3 saves data in a database file that loads upon system start. The local process is implemented in Javascript using Node.js. Models are JSON document loadable sub-processes saved in a JSON database. The message bus 105 may be implemented as direct IP sockets, or other message management system, such as Zero MQ, and the messages transmitted over the message bus are JSON documents.

Figure 2:
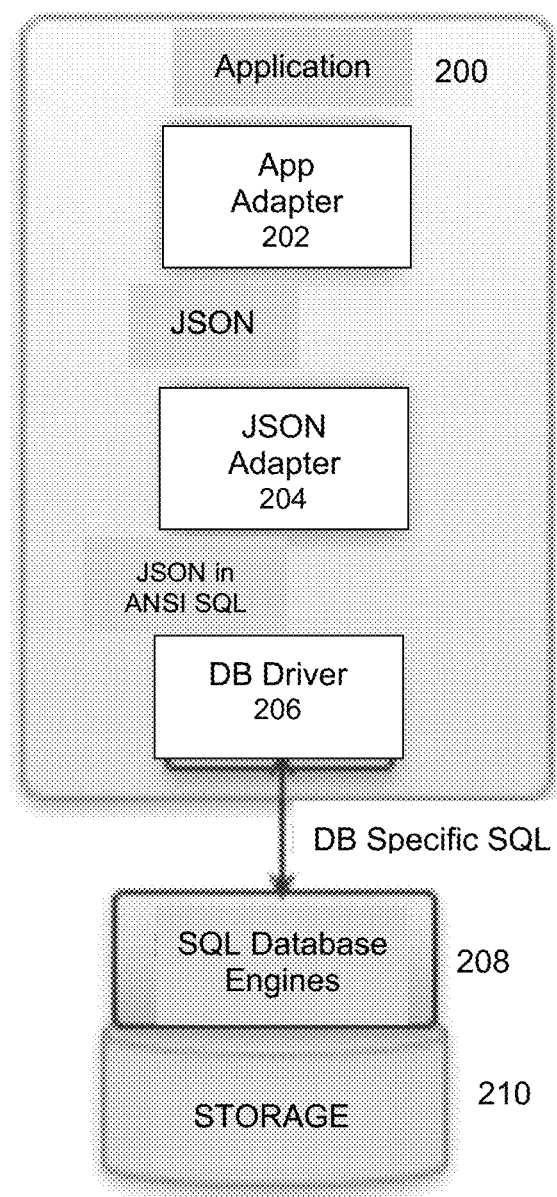
FIG. 2 illustrates a JSON adapter, under some embodiments.

As stated above, the JSON DB uses standard SQL database engines as its backend storage. In an embodiment, a JSON adapter is used to store JSON documents in a SQL table and provide means to perform efficient queries to the documents. FIG. 2 illustrates a JSON adapter, under some embodiments. As shown in FIG. 2, a data processing application 200 interfaces with SQL database engines 208 that store and retrieve data from storage media or devices 210. An application adapter 202 provides application-level JSON storage handling functions, and the DB driver 206 handles communications with the selected backend database engine 208, which is SQL (or Sqlite3) for the embodiment shown. The backend database engine 208 handles interaction with the storage medium 210. Depending on implementation details, the system typically needs one each of the application adapter, JSON adapter, and DB driver in the programming language that the application uses, and it needs a DB Driver 206 for the specific SQL database engine being used.

As shown in FIG. 2, application 200 includes a JSON adapter 204. This component is configured to parse JSON documents (which may be provided in a JSON document tree) into a SQL insert, update, or delete queries; and inflate JSON rows back into JSON documents in response to a user SQL select query. The JSON adapter thus provides two main novel features. The first is storing an entire set of JSON documents with a single SQL insert query in a single table of a SQL database, and the second is to facilitate the retrieving of any JSON documents using a single SQL query.

With respect to the first feature, the JSON adapter defines a SQL schema for a JSON database table that can represent any node from a JSON document. The JSON schema represents the implicit property, the {name:value} pair, at the core of JSON. This allows entire JSON documents to be recorded in a single table in a common SQL database like Sqlite3, PostgreSQL, MySQL, Oracle, etc. In an embodiment, a Javascript library supporting JSON databases is built. A JSON DB Library function reads the JSON documents and auto-generates SQL insert statements. An entire JSON document can be saved to the JSON database with a single insert query. JavaScript natively supports the JSON data standard, and many programming languages have multiple JSON libraries for integrating standard JSON data.

Figure 3:
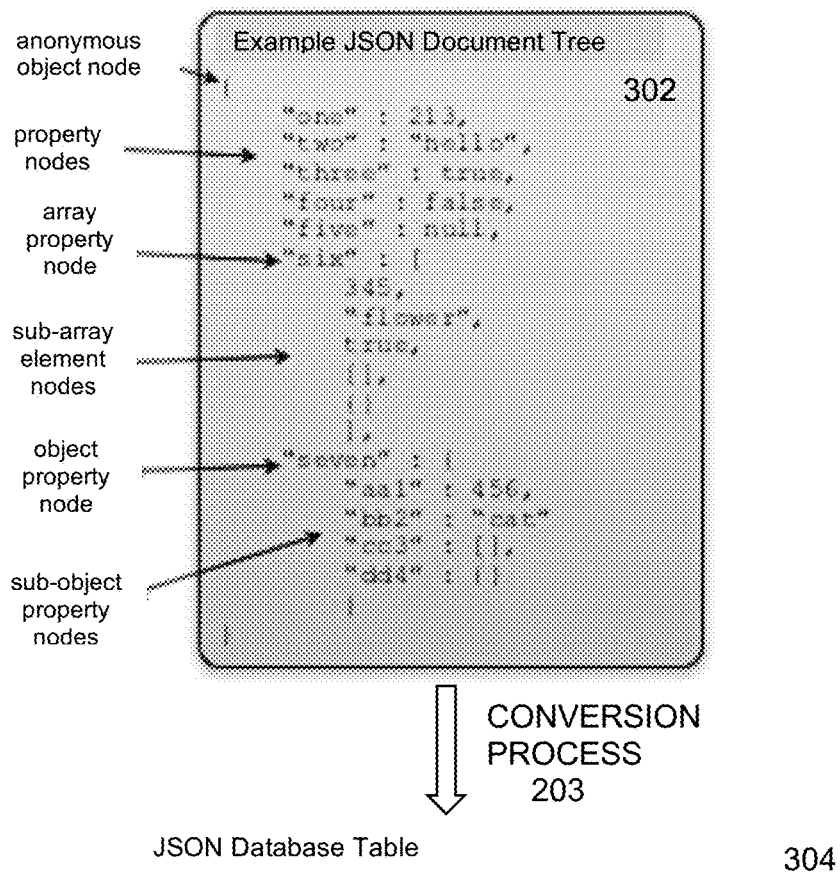
FIG. 3 illustrates a method of converting JSON nodes to database rows in a conversion process of the JSON adapter, under some embodiments.

FIG. 3 illustrates a method of converting JSON nodes to database rows in a conversion process of the JSON adapter, under some embodiments. As shown in FIG. 3, an example JSON document tree is presented as follows in the example code segment:

| Example JSON Document Tree |
|---|
| { <br>   "one" : 213, <br>   "two" : "hello", <br>   "three" : true, <br>   "four" : false, <br>   "five" : null, <br>   "six" : [ <br>     345, <br>     "flower", <br>     true, <br>     [ ], <br>     { } <br>   ], <br>   "seven" : { <br>     "aa1" : 456, <br>     "bb2" : "cat" <br>     "cc3" : [ ], <br>     "dd4" : { } <br>     } <br> } |

This example JSON document tree has 17 nodes, starting with the containing anonymous object. The nodes include examples of each of the 6 JSON data types: object, array, string, number, Boolean, and null. There are two empty array nodes and two empty object nodes.

In the above example JSON structure, the open bracket { denotes an anonymous object node. Property nodes comprise data elements that have values, such as the nodes "one" to "five." A property node has a single value, while an array can have multiple values, as shown for the example array property node "six." Sub-array element nodes are included as shown as part of the array property node. An example object property node is shown for data element "seven" with associated sub-object property nodes.

The conversion process 203 converts the JSON nodes to DB rows in a SQL database. In this conversion, JSON nodes become rows in the JSON database table. Database table 304 illustrates an example database that is generated from the example JSON document tree 302.

The JSON database table has entries that conform to a schema that is defined as follows: Schema==>id, path, type, name, value.

In this schema, id is a unique identification number; path specifies node path to the root of the JSON document; type is a JSON datatype specifier string, and is one of: object, array, string, number, Boolean, null; name is the JSON node name if node is an object property, and is empty otherwise; and value is the JSON node value if node is a scalar value (string, number, Boolean, or null), and is empty otherwise. In implementation, the id is assigned automatically as a sequential numerical value; the path is the list of node ids back to the document root; the type is a standard JSON datatype; the name is generally user configurable, and the value is an actual value.

The example data base table 304 of FIG. 3 is shown as follows:

| JSON Database Table |
|---|
| 1,<0,1>,"object","","";<br>2,<0,1,2>,"number","one","213";<br>3,<0,1,3>,"string","two","hello"; |

| JSON Database Table |
|---|
| 4,<0,1,4>,"boolean","three","true"; |
| 5,<0,1,5>,"boolean","four","false"; |
| 6,<0,1,6>,"null","five","null"; |
| 7,<0,1,7>,"array","six",""; |
| 8,<0,1,7,8>,"number","","345"; |
| 9,<0,1,7,9>,"string","","flower"; |
| 10,<0,1,7,10>,"boolean","","true"; |
| 11,<0,1,7,11>,"array","",""; |
| 12,<0,1,7,12>,"object","",""; |
| 13,<0,1,13>,"object","seven",""; |
| 14,<0,1,13,14>,"number","aa1","456"; |
| 15,<0,1,13,15>,"string","bb2","cat"; |
| 16,<0,1,13,16>,"array","cc3",""; |
| 17,<0,1,13,17>,"object","dd4",""; |

As shown in this example, the id's range from 1 to 17, and each id entry has a unique path, such as <0,1>, <0,1,2>, <0,1,3>, and so on. It should be noted that paths generally start at 0 (for example <0,1,6>) to include the JSON database table as an anonymous array that is the root of the table's document collection. The type, names, and values for each id are then provided as entries for the database row for that id. The schema and storage of the database table that is converted from the document tree facilitates a powerful query and retrieval process.

The path field is a string that records a JSON node's path to its document root. The numbers in the path is the list node parent ids leading back to the JSON document root. Using a SQL query to search for a specific sub-document path will return all the node-rows belonging to the sub-document. The returned rows are inflated back into JSON by using the path value to guide reconstruction of the original JSON document tree. In this way, entire JSON document trees can be retrieved using a single SQL query, which is very fast compared to standard known processes.

The following example code segment illustrates an example query that may be performed on a JSON database table, such as table 304. The query is: retrieve sub-object at id 13 in table 304, and the code is shown as follows:

```
select * from json-table
  where path like '<0,1,13%'
  order by id;
```

This query will return rows of the database as follows:

```
13,<0,1,13>,"object","seven",""
14,<0,1,13,14>,"number","aa1","456"
15,<0,1,13,15>,"string","bb2","cat"
16,<0,1,13,16>,"array","cc3",""
17,<0,1,13,17 >,"object","dd4",""
```

These returned rows will inflate into:

```
{
  "seven" : {
    "aa1" : 456,
    "bb2" : "cat"
    "cc3" : [ ],
    "dd4" : { }
  }
}
```

It should be noted that the id and path are not in the inflated JSON returned rows. The Javascript JSON DB library has functions to inflate rows from JSON DB into live Javascript data-object.

Figure 4A:
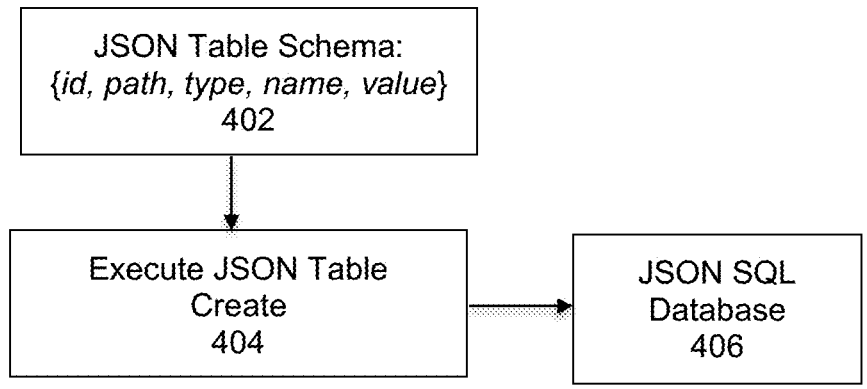
FIG. 4A is a flowchart that illustrates a method for creating a JSON-style table in a SQL database, under an embodiment.
Figure 4B:
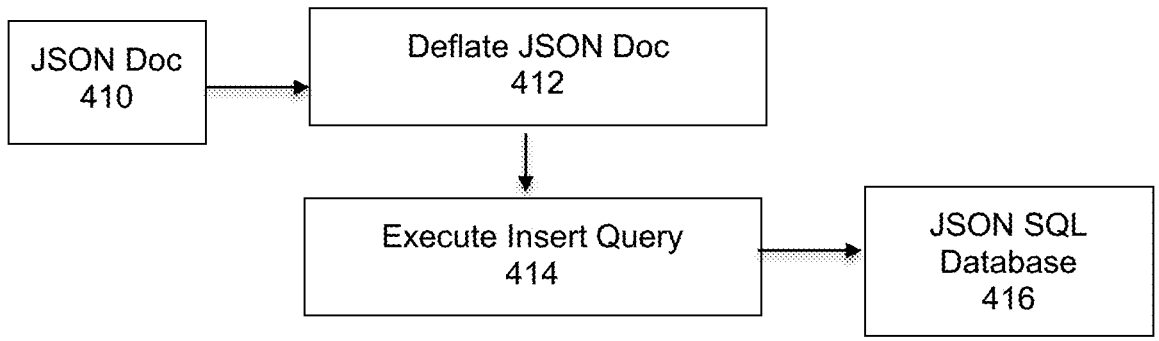
FIG. 4B is a flowchart that illustrates a method for inserting a JSON document into the SQL table with a single SQL insert query, under an embodiment.
Figure 4C:
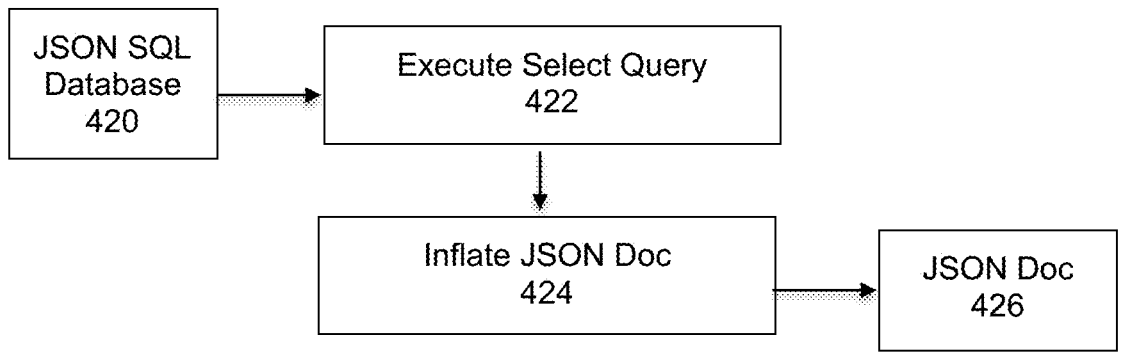
FIG. 4C is a flowchart that illustrates a method for retrieving JSON documents with a single SQL select query, under an embodiment.

FIGS. 4A-C are three flowcharts that respectively illustrate a method for representing JSON documents as rows in an SQL table, a method for inserting a JSON document into the SQL table with a single SQL insert query, and a method for retrieving JSON documents with a single SQL select query, under some embodiments. The processes in FIGS. 4A-C take a JSON document tree that may contain a number of sub-documents and converts them to a set of individual rows in a single SQL database table. A defined schema that dictates storage of the nodes in the table rows allows a single query to return any or all documents in the original JSON document tree.

FIG. 4A illustrates a process that creates JSON tables in an SQL Database to setup a JSON Database. The process begins in step 402, by defining a JSON database table SQL schema as follows: Schema=id, path, type, name, value. This schema is relatively simple, and creating a new JSON-style table in an SQL database is computationally easy. The system needs to create at least one JSON-style table before inserting JSON documents. Thus, in step 404, the process executes a JSON table creation process to create a JSON SQL database 406.

To write a JSON doc to the database, the JSON adapter deflates a JSON document and generates a single SQL insert query. FIG. 4B is a flowchart that illustrates a process of writing a JSON document to a JSON SQL database. As shown in FIG. 4B, a JSON document 410 is deflated in process step 412. The process then executes an insert query 414 to write the JSON document to the JSON SQL database 416 with this single insert query.

To select a JSON document or part of a JSON document from the database, a select query may request the document by id. Executing the select query reads the entire JSON document sub-tree from the database. The JSON adapter inflates JSON rows returned by the database into a JSON document. FIG. 4C is a flowchart that illustrates a process of reading a JSON document from the database. As shown in FIG. 4C, the process executes a single select query 422 on JSON SQL database 420. It then inflates the JSON rows that are returned through this query in step 424 to produce the JSON document 426.

This schema described above can essentially represent any node from a JSON document tree. This schema itself leverages the implicit {name:value} pair property that is at the core of JSON. This schema is applied to create a JSON table in the SQL database. The entire JSON document tree is then stored in a single SQL database table by converting the JSON nodes into database rows using the defined schema. This conversion can be accomplished by using a JSON Adapter library function that reads JSON documents and auto-generates SQL insert statements. The path field records the path of a JSON node to its document root in a hierarchical listing of parent node id's. Once the conversion of the JSON document tree to the SQL database table is accomplished, the table is ready to be queried by a user. A user will use the SQL select query to search for a specific sub-document or set of sub-documents among all of the JSON documents provided in the original JSON document tree. As shown in FIGS. 4A-C, the process responds to the user query by returning all node-rows belonging to the sub-document. The returned rows are then inflated back into JSON by using the path value to guide reconstruction of the original JSON document tree. Using this method allows entire JSON document trees to be retrieved using a single SQL select query.

The above-described process directly stores JSON documents in an SQL database using a simple defined table schema, and uses the SQL query language to retrieve specified JSON documents. Aspects of the described embodiments use certain conventions provided by the JSON framework, while adding certain novel and beneficial enhancements.

JSON Database and Application Framework

Embodiments of the data processing system are built on the JSON (JavaScript Object Notation) standardized data-serialization protocol. JSON is a text format that is completely language independent, but it is easily human and machine readable, and so is easy for machines to parse and generate. It is flexible, and covers important data structures and data types, and has become widely used as the data-interchange format for web-based applications and APIs.

JSON is built on two structures: (1) A collection of name/value pairs, which is typically realized as an object, record, struct, dictionary, hash table, keyed list, or associative array; and (2) an ordered list of values, which is typically realized as an array, vector, list, or sequence. An object is an unordered set of name/value pairs. An object begins with { (left brace) and ends with } (right brace). Each name is followed by a : (colon) and the name/value pairs are separated by , (commas). An array is an ordered collection of values. An array begins with [ (left bracket) and ends with ] (right bracket). Values are separated by , (commas). A value can be a string in double quotes, or a number, or true or false or null, or an object or an array. These structures can be nested. A string is a sequence of zero or more Unicode characters, wrapped in double quotes, using backslash escapes. A character is represented as a single character string. A string is very much like a C or Java string. A number is like a C or Java number, except that the octal and hexadecimal formats are not used.

Figure 5:
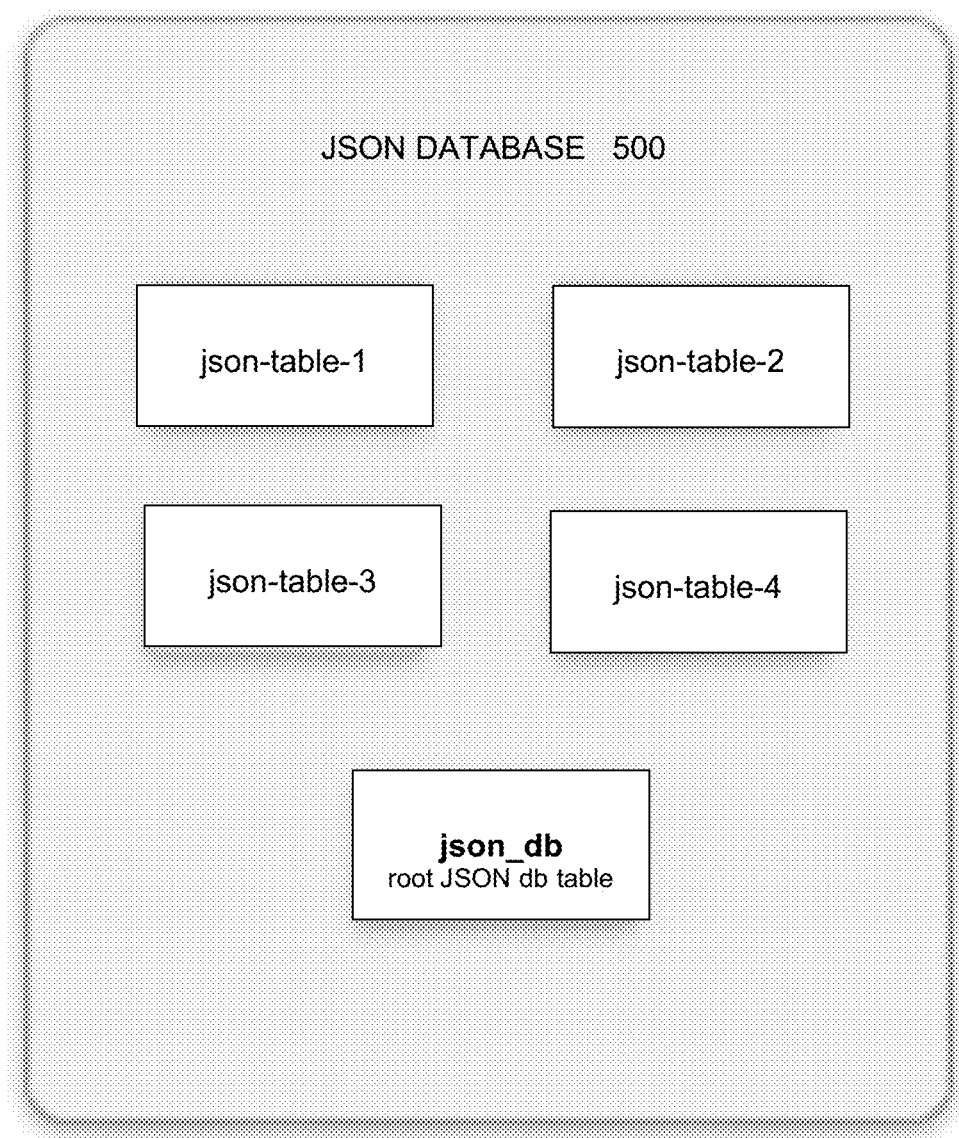
FIG. 5 illustrates an example JSON database, under some embodiments.

A JSON database, such as database 108 stores JSON documents in an SQL database. A JSON database only needs and only has JSON tables created according to the JSON schema. FIG. 5 illustrates an example JSON database 500, under some embodiments. As shown in FIG. 5, the JSON database 500 includes a number of individual tables denoted json-table-1 to json-table-4, and a root JSON database table.

In an embodiment of the JSON document conversion process, JSON document nodes are stored as SQL rows according to the JSON schema. A JSON document structure is recorded by the path field for each JSON document node. Multiple JSON tables can be created to partition JSON data for any logical or performance reason. Tables can be application specific. The table named json_db is designated as the JSON DB root table. The index from this table will loaded when the database starts up.

A Javascript JSON Adapter library provides functions for easy utilization of a JSON database. The Javascript JSON DB library is used to generate insert/update queries for live JSON documents. It inflates JSON rows retrieved from a JSON table back into a live JSON document. It should be noted that although shown for a particular programming language, the Javascript JSON Adapter library can be rewritten for C, Java, Python, or any other appropriate language.

JSON tables, such as those in FIG. 2 are relatively easy to create. Below is an example code segment illustrating creation of a JSON table, under some embodiments:

```
drop table if exists json-table;
create table json-table (
    id      integer not null primary key autoincrement,
    path    varchar(1024)   default "",   -- node ancestor ids
    type    varchar(8)      default "",   -- node type
    name    varchar(1024)   default "",   -- node name
    value   text            default ""    -- node value
);
create index json_path_idx on json-table(path);
```

For the above code segment, it should be noted that a 1024 character length path provides space for JSON doc trees with a hierarchy depth of approximately 384 levels. 4096 gives about four times as many levels. Since a database table is an array of rows, each JSON table implicitly implements an anonymous array as its document root. All JSON documents are stored as elements of these anonymous arrays. This is symbolized in the path as the zero'th id list entry: <0,1,2>

The basic SQL syntax shown in the code segment above is specific for the SQLite3 database. SQL syntax for other database products are almost identical. The Javascript JSON Adapter library has functions to create, copy, and drop JSON tables of specified name.

Present known methods of using SQL databases require multiple database tables to represent application data, that is, data on how an application is structured, how it operates, and the data that it processes. In an embodiment, all of this data is instead represented in JSON document trees and saved as JSON data. Saving application data to an SQL database in the form of JSON document trees simplifies the database interface to a single JSON API for all data. This means that the layout and content of application data objects is free to evolve during development without impacting the database, such that the JSON database schema effectively never changes. New versions of an application data object can be saved alongside older versions, as the JSON DB just saves the JSON document trees. Application changes never cause changes to the JSON database schema or to the database interface API (application programming interface).

Application data objects are application data types. Application data objects are live inflated expressions of literal JSON document trees. Application data objects may be data-only objects, with multiple data properties and may lack object methods or functions. An application data object, as a literal JSON document tree, can be stored as a list of JSON document node rows in the JSON database. Application data objects can be retrieved and inflated from the JSON database via a single SQL query. When updating an application data object back to the JSON database, only the differences are updated.

Below is an example code segment illustrating an example application data object for a person, under some embodiments:

| Person Data Object |
| --- |
| joe = {<br>    id : 1,                         // db id<br>    type : 'person.1',         // data type<br>    sdate : 1468541108,     // meta data<br>    cdate : 1468541108,<br>    enable : 1,<br>    name : "Joe Black",       // data<br>    position : "Chief Trouble Maker",<br>    note : "Joe is a good guy gone bad."<br>} |

In the above example, a Person Data Object is an application data type. The Person Data Object is the live inflated version of its JSON document tree representation. The id property links a person data object to its row in the JSON table. The type property (with version number) identifies the application data object as the Person data type, version 1; and Meta data is application bookkeeping data; and Data is the Person data type payload.

A JSON database can hold JSON document trees for multiple applications. Applications can be totally independent or can be components of a larger operational unit that works together. Application frameworks hold app meta data, operational data structures, and process transient data. Frameworks can save the functional state of operations so that processing can resume where it left off after an interruption. Frameworks allow applications to become miniature DSLs via key-commands and scripts saved in the meta.symbols sub-object.

Below is an example code segment illustrating an example application framework, under some embodiments:

```
                    Application Framework Object app = {
    id : 20,                    // db id
    meta: {                     // meta data
        type : 'application',
        name : 'name-string',
        symbols : { }
    },
    data : {                    // app data
        types : {
            type1 : [ ],
            type2 : [ ]
        },
        other : { }
    }
}
```

An application framework describes an application that uses the JSON database. An application can retrieve its inflated framework from the JSON database with a single query. The application framework has three main properties: its database id, a meta sub-object, and a data sub-object. The meta object has the application type and name, and an application specific symbols sub-object. The data object has a types sub-object that holds arrays of application data-objects by type. The types sub-object lists available application data types. The other sub-object is for other data needs.

For the above example code segment, the meta.symbols sub-object holds important information about the application and its operation; the data.types sub-object holds lists of app-typed application data objects that the application processes or uses to perform its functions; and the data.other sub-object holds transient data used by the application for operations performance.

For distributed processing, a distributed index enables local processes 106 to easily identify, access, and use local and remote resources. This allows distributed applications to share the workload of complex distributed processes like a network of switches collaborating to manage network traffic. The distributed database shares configurations and setups, ongoing state and status; it also shares the decision process on how to divide up the workload, and the working data. In cooperatively distributed data and process sharing, each local process follows specific read/write rules when working with remote data and processes, and distributed communications are performed via the message management system of bus 105.

An index is a JSON document saved in each JSON-style table that provides meta data about the extended distributed JSON database and indexes references to important JSON documents to simplify access. Indexed JSON documents can reside in any separate database belonging to the JSON database collective.

The following example code illustrates a JSON database index under some embodiments:

```
index = {
    id : 1,
    meta : {
        type : "index",
        name : "index-name",
        symbols : { },
        table : "tb-name",
        database : "db-name",
        databases : [
            { database : "db-name", tables : [ "tb-name1", "tb-name2",
... ] },
            ...
        ],
        ...
    },
    index : {
        name1 : { id: num, path: "path-str" },
        name2 : { table: "tb-name", id: num, path: "path-str" },
        name3 : { database: "db-name", table: "tb", id: num, path:
"path-str" },
        ...
    }
}
```

The index object provides access to JSON Doc references by name. The meta.databases array holds a list of all databases (plus their tables) in the extended JSON Database collective. The meta.symbols object holds references to important JSON Doc resources by key-name. Each JSON database has a root json_db table whose index is loaded automatically when the JSON database starts up. This root index provides access to JSON Documents important for distributed JSON database operation. The index.meta.name names an index, making it possible to put multiple indexes into a single JSON-style table for any purpose. The JSON document references in the index object may have optional table and/or database entries to indicate that the referenced doc resides in an alternate table or remote database/table.

Implementation

As stated above, in an embodiment, a JSON database is built on an open source SQLite3 database implemented with node.js and JavaScript. The base JSON SQL query templates are saved in the JSON database and are customized on the fly when a JSON query is executed. In a practical implementation, users simply call the JSON application driver interface API to implement the system.

Figure 6:
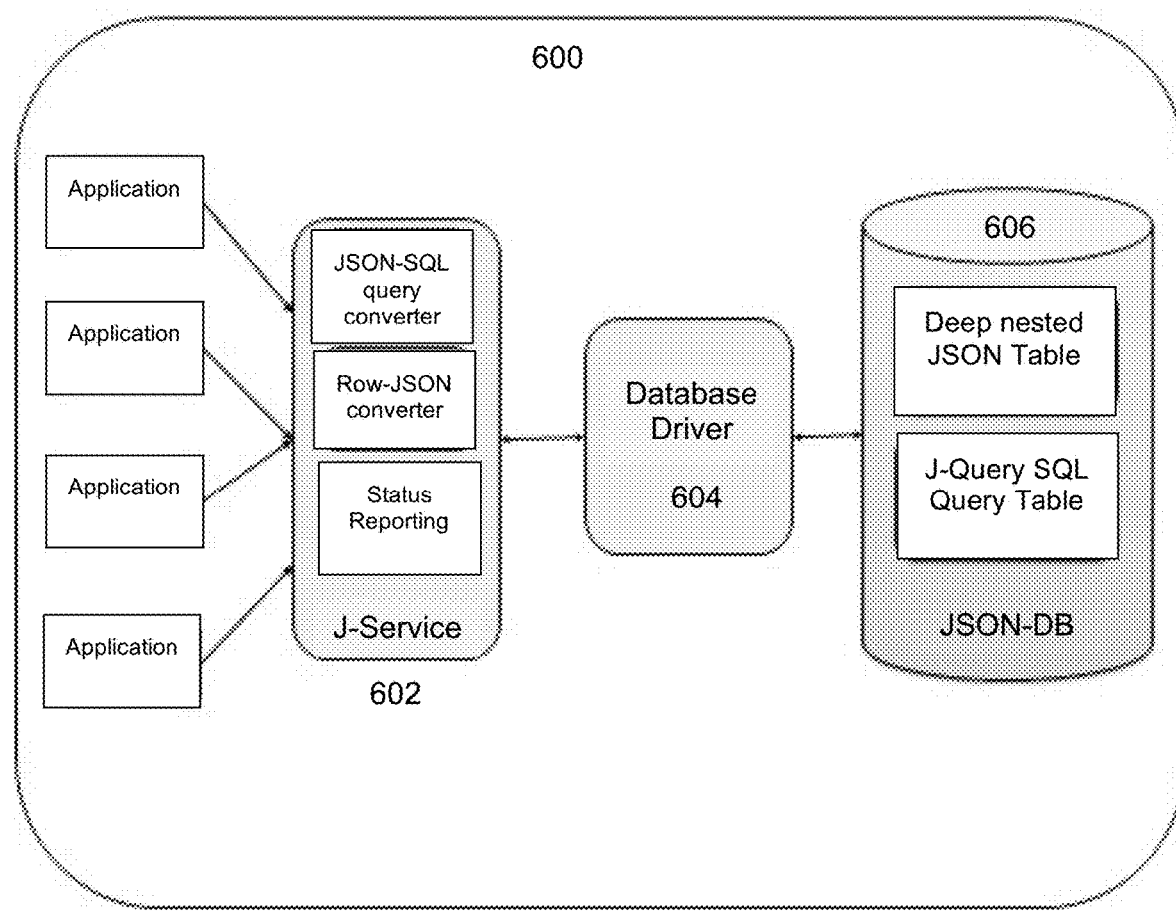
FIG. 6 is a block diagram of a JSON database system, including a JSON adapter, under some embodiments.

FIG. 6 is a block diagram of a JSON database system, including a JSON adapter, under some embodiments. The JSON database 606 of system 600 uses a deep-nested JSON table. The JSON database table json_db defines a simple SQL schema (id, path, type, name, value) for the JSON database. One key benefit to the JSON database is that its schema never changes. Since all data can be represented as a JSON document tree, and the json_db table can hold any and all the desired JSON data, then the json_db can hold any and all data present in a JSON document tree. New data can be stored in the JSON database without ever needing to change the JSON database schema. The JSON database interface code does not need to be changed to support any changes in the kinds of data that any application needs to save in the JSON database. The json_db table can defined as follows:

```
drop table if exists json_db;
create table json_db (
    id      integer         not null primary key autoincrement,
    path    varchar(1024)   default "",
    type    varchar(8)      default "",
    name    varchar(1024)   default "",
    value   text            default ""
);
```

The json_db record format can be expressed as:

```
{
    id:     number,         -- primary key, auto-indexed
    path:   string,         -- element ancestor ids list 1, 2, 3,...
    type:   string,         -- element type: object, array, string,
    number, boolean, null
    name:   string,         -- element name
    value:  text            -- element value
}
```

The database driver 604 is an abstract interface driver to some specific SQL database product. This driver assembles and executes customized JSON SQL queries and returns JSON row data or results/errors. The J-Service component 602 is a JSON application driver that collects parameters and chooses queries for the database driver 604 for final assembly and execution; it then receives JSON data rows for inflation into JSON document trees. The JSON application driver has multiple methods for selecting any subset of a JSON document tree, and converting the raw rows into any desired format, such as straight JSON text or JavaScript objects in a typical implementation. The JSON application driver is made to be agnostic to the backend SQL database product and will work on any SQL database product supported by a database driver. Basic functions include: Get query, Find query, Insert query, Update query, Delete JSON documents, Create a JSON-style table, Drop a JSON-style table, and Copy JSON documents from one table to another table.

Together, the database and JSON application drivers can handle any ad-hoc or document tree based query and will return the selected JSON data or JSON document sub-tree. An application only interacts with the JSON Application driver. An entire JSON document or document sub-tree can be inserted into the JSON Database with a single query, and an entire JSON document or document sub-tree can be returned with a single query.

Each row in a JSON-style table represents a property and has the following fields: id, path, type, name, and value. The JSON-style table has only five fields and can hold arbitrary JSON document trees of any size or depth. Rows in a JSON-style table represent nodes in JSON document trees. In general, SQL queries are easy and simple to write and execute. JSON document data can be selected ad-hoc, random-style, or via the path, i.e., document tree style. Query operations on the JSON database are very flexible.

The json_db records always have a primary-key id, a path string, and type. Array and object records do not use the value field. Object property records use both the name and value fields; array element records do not use the name field; value fields are text strings that represent strings, numbers, Booleans, and null.

A Primary-key id provides a unique numeric identifier for all json_db element property records. The original element order in objects and arrays is preserved by the primary-key id, as property records are written in the original JSON doc order to the json_db table. Use 'order_by_id' clause to insure original order. Property records are written depth first.

The path is an ancestor ids list linking back through all parent objects and/or arrays on a property record's (a JSON element) path to the root. Paths have the form ',1, 2, 3, 4, 5, '; the commas (or any other special char) provide search ability. The size parameters are variable and depend on implementation, but 1024 characters provide JSON documents with a path depth up to 384 levels. Double 1024 and the path depth increases to about 768 levels. The last id in the path array is the record's own self id. The path makes it possible to retrieve all elements for an arbitrary JSON document (tree) with a single select query. Type is a string that specifies the JSON type of a property record. Type is one of object, array, string, number, Boolean, or null, and may be extended with more types, as long as in conformance with the JSON standard. The name is the property record's name string in its JSON parent object; empty otherwise, and 1024 characters provide for very long names. The value holds the property record's scalar value as a text string; value is one of string, number, true, false, and null as text strings; empty otherwise.

Example Applications

Any number of different application types may utilize the JSON document to SQL table conversion method and system described herein. One example use case is a web service to monitor the operation of security cameras installed in large facilities. Cameras are plugged into Power over Ethernet (POE) switches that provide power to cameras via their Ethernet cable connection. Often, cameras shutdown or experience a problem and stop functioning, requiring a technician to visit the camera location to force a restart. A camera application web service provides a connection to the cameras (via the Internet) and to the POE switches supporting the cameras. The camera application provides the capability for operators to shutoff and restart cameras remotely, either by restarting the camera directly or by restarting the POE port on the switch connected to the camera. It provides the means for monitoring POE switch and camera health and performance, as well as the ability to see camera video, and supports multiple users, user login and roles, multiple cameras at multiple locations in multiple buildings. The camera application uses a wealth of data to support security camera management, and typical data stored includes: buildings, building addresses, camera locations, people with access, access roles, encrypted login credentials, contact information, switches, switch models, switch commands, user to switch access links, devices (cameras), device models, device commands, user to device access links, notes, and queries. Such an application may have on the order of 20 to 50 or more database tables, depending on the size of the facility and complexity of the system. Each type of data (as represented by the database tables) requires about four modules: router, service, model, and data. Each of these modules performs specific functional and business operations, where each module can be upwards of a thousand lines of code. For example, 50 database tables may require 200 modules, or about 200,000 lines of code that must be developed, tested, and maintained. Other modules are required to handle specific application and business logic. A system that has 20 database tables may require on the order of 60,000 lines of code, which is clearly a significant amount of code to write, debug, and maintain.

In an embodiment, the camera application is written in JavaScript using node.js, Express, and the Sqlite3 database. Storing the JSON data in an SQL database table reduces the multiple tables required in the traditional database schema design to just a single table. In one implementation, this replaces the need for some 60,000 lines of code with only about 4,000 lines of code, which is a 93.3% reduction in code, while still accomplishing the same function. In addition, the code is simpler, and the matching business code is simpler due to the use of JSON.

Another example use case is an OS10 distributed database. Installing the JSON database on OS10 is straightforward because OS10 is a version of Linux. Installation packages for SQLite3 and Node.js exist for every version of Linux. The JSON DB's two main drivers are less than 2000 lines of Javascript code and the JSON DB Schema.sql file is under 100 lines. The JSON DB Javascript code only includes the Sqlite3 driver packages and almost nothing else. Compilation is not necessary with Javascript; just copy to an appropriate node setup directory and it is ready to go. Given that Sqlite3 is an in-memory database, this implementation of the JSON DB is also in-memory. Developers would incorporate the JSON DB code into their applications to access the database. Otherwise, one could install server-based MySQL or PostgreSQL databases, run the JSON DB schema script, then use the JSON DB via typical remote connections to either MySQL or PostgreSQL servers. Developers would include the JSON DB interface code as packages in their applications. Once the JSON DB is installed, it can be used as a distributed database on OS10. A standard communication protocol can be used to move JSON data between OS10 (and other) systems. Each system can manage its own local JSON data as well as maintain copies of every other systems' JSON data as a distributed backup. Since SQL database maintain ACID consistency through transactions, linked transactions between different systems can maintain JSON data consistency across distributed data sets. When a new system came online, it could download the default JSON data set for local customization. If a system fell offline for any reason, it could restore to the current state from the distributed JSON data when it rejoins the network. One feature of the SQLite3 database is that it saves its in-memory data to a simple file on the system where it runs. Should a system go down, it would come back up where it left off, and could update quickly to the current state by loading data from the distributed JSON DB network. The JSON DB can have any number of JSON-style tables, and thus can hold multiple backups, or different DBs for different network condition.

A third use case is a phone-home backend database. In this type of application, a server captures the state of the local system and local network in a series of snap-shots to be used to model and monitor network state and performance. Specific JSON-style tables can be setup to do structural-functional system logging that can be readout in JSON for easy post-processing. Simple programs can be implemented to monitor network loading to choose less busy times to push logs and data to off-network JSON DB storage for high-end network analytics. Automated network management functions could compare real-time network performance against historical behavior to guide ongoing network operations.

The above example use cases are provided for illustration only, and embodiments are not so limited. Any practical standalone or distributed application may be configured to use the JSON document to SQL database table conversion and schema described herein. The JSON DB can have multiple JSON-style tables for multiple purposes. All have the same schema and hold the same JSON data format. Easy SQL queries can copy JSON data from one table to another quickly. Building a distributed JSON DB that spans multiple computers is as easy as moving data from one machine to another. New kinds of application data can be added to the system without having to change database schemas or any database interface code. The simple flexibility of JSON data and the ease with which new application data types and structures can be added makes ongoing development of network analytics capabilities much easier than in present systems.

For the embodiments described, implementing a JSON database on an SQL database gives the flexibility of the JSON data standard on the power of an SQL database. The JSON database on SQL is much easier to use and runs faster than NoSQL databases like MongoDB and Redis. The system is able to retrieve an entire JSON data tree with a single SQL query. Writing and updating JSON data trees in the database can also be done with a single query string. The entire table-full of JSON data can be retrieved as a JSON data-tree with a single query. The JSON database performance is the same as the underlying SQL database product used by the JSON database because JSON DB queries are essentially simple SQL queries. An additional major advantage to the JSON DB approach is that changes in application data require no changes to the JSON database schema or interface code. Maintenance on the JSON DB is virtually never required.

The JSON Database is made possible by two key aspects. The first is that JSON has a simple, specific, implicit data structure built into its core, i.e., a data structure that can be used in a database table to represent each of the 6 native JSON datatypes: object, array, string, number, boolean, and null. This core implicit data structure is an object property i.e. the {key: value} pair. The second aspect that JSON data structures implement hierarchical data trees, the JSON document trees. This is because JSON objects can have properties with sub-objects and sub-arrays as values, and JSON arrays can have sub-objects and sub-arrays as element values. The method described herein encodes the structure of JSON document trees by recording the path from each data item in the tree back to the root of the JSON document tree. This makes it possible to obtain an entire JSON document sub-tree from the JSON database with a single SQL query.

In a computer network embodiment having computers and devices running applications, each application is written in the JavaScript language using the Sqlite3 or similar SQL database. The DBMS includes a JSON interface that provides a relatively simple way to store JSON data in an SQL database table that reduces the multiple tables required in the traditional database schema design to just a single table.

Figure 7:
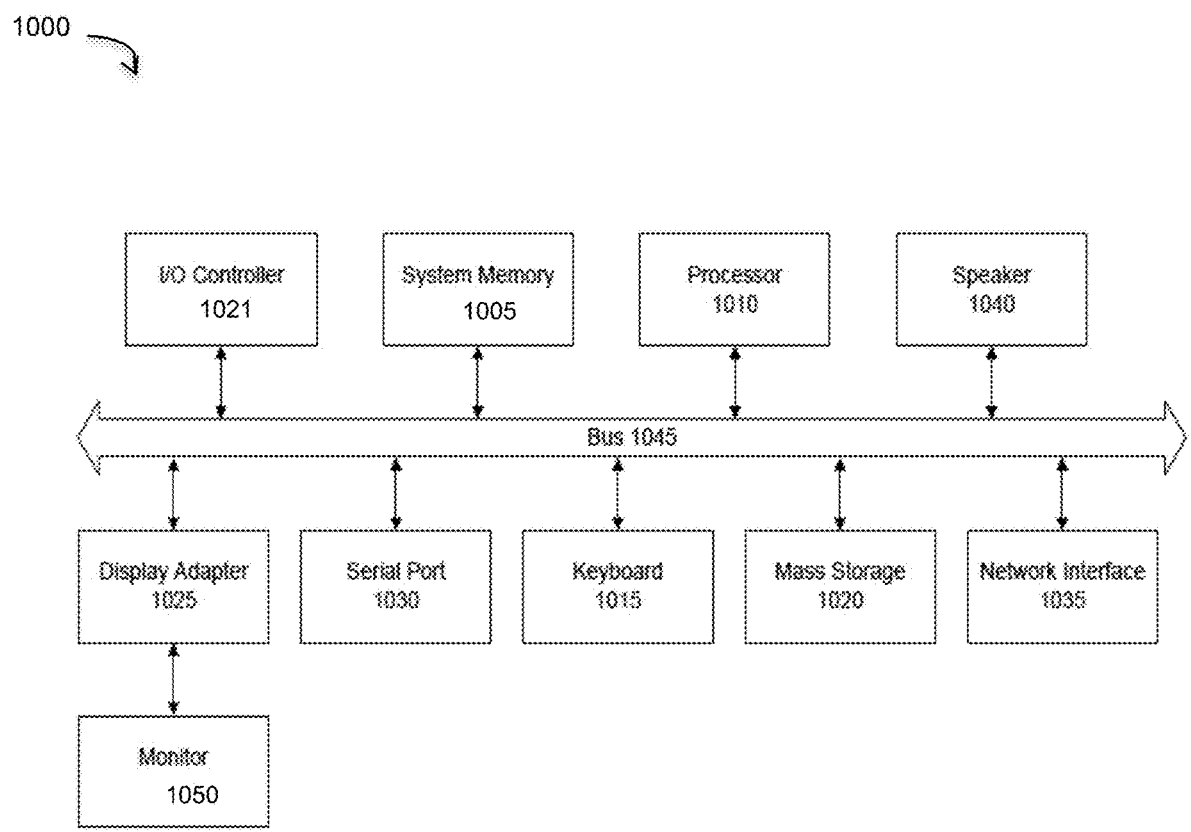
FIG. 7 is a block diagram of a computer system used to execute one or more software components of a JSON adapter, under some embodiments.

As described above, in an embodiment, system 100 includes a JSON adapter component or module that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein. FIG. 7 is a block diagram of a computer system used to execute one or more software components of a JSON adapter, under some embodiments. The computer system 1000 includes a monitor 1050, keyboard 1015, and mass storage devices 1020. Computer system 1000 further includes subsystems such as central processor 1010, system memory 1005, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 7 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Embodiments of the natural language processing and machine learning, as well as cognitive computing are all elements of technology that are on long term technology roadmaps. The ability to provision, control, and interact with a device that is resident in a network topology using Natural Language provides a disruptive shift to the normal method of this operation by eliminating specialized certifications and understanding of specific products. The use of generalized language mechanisms to provide the interface levels provides a market differentiator for device interaction Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

Embodiments may be applied to data, storage, industrial networks, and the like, in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:
1. A method comprising:
defining a schema to store JavaScript Object Notation (JSON) nodes in a Structured Query Language (SQL) database table in a memory storage device;
converting each JSON node into a corresponding row of the SQL database table using the schema to encode a hierarchical relationship of nodes and sub-nodes into a path that specifies a node path to a root node for each node;

receiving a SQL query to find a specific sub-node;

responding to the query by returning all rows of the SQL database table belonging to the sub-node; and inflating the returned rows back into a JSON expression by using the path to guide reconstruction of the original JSON nodes.

2. The method of claim 1 wherein the JSON nodes comprise documents of a JSON document tree.

3. The method of claim 2 wherein the JSON nodes include each of six JSON data types of the group consisting of: object, array, string, number, Boolean, and null.

4. The method of claim 3 wherein the schema comprises an ID, path, type, name, and value; wherein the ID is a unique identification number for a node; the type is a JSON datatype specifier; the name is a user configurable JSON node name if the node is an object, and the value is a JSON node value if the node is not an array.

5. The method of claim 2 wherein the converting comprises:
reading the documents using a JSON database library function; and
automatically generating SQL insert statements into the documents to convert each document into the corresponding row of the SQL database table.

6. The method of claim 5 wherein the SQL database table comprises a single table, the method further comprising saving the entire document tree in the single SQL table.

7. The method of claim 6 wherein the single table is implemented in one of: SQLite3, PostgreSQL, MySQL, and Oracle.

8. The method of claim 2 wherein the inflating comprises using a JSON database library function to back-convert each corresponding row of the SQL database table into a live Javascript data object for a corresponding document or sub-document of the JSON document tree.

9. The method of claim 8 further comprising displaying the live Javascript data object to a user through a graphical user interface.

10. A system comprising:
an application executed in a networked computer to perform tasks using data processed in the system;
an application adapter providing application-level JSON (JavaScript Object Notation) storage handling functions;
a JSON adapter converting JSON documents embodying the data into corresponding rows of a SQL database table and inflates the rows of the table back into corresponding documents in response to a SQL query for the corresponding documents;
a database driver communicating between the JSON adapter and a database engine;
a storage device storing the data in the SQL database table as specified by the database engine.

11. The system of claim 10 wherein the JSON adapter converts JSON documents into SQL insert, update, and delete queries.

12. The system of claim 10 wherein the SQL database table is a single table and is implemented in one of: SQLite3, PostgreSQL, MySQL, and Oracle.

13. The system of claim 12 wherein the data is originally stored in a JSON document tree having nodes and sub-nodes corresponding to each of the JSON documents.

14. The system of claim 13 wherein the JSON nodes include each of six JSON data types of the group consisting of: object, array, string, number, Boolean, and null.

15. The system of claim 14 wherein the schema comprises an ID, path, type, name, and value; wherein the ID is a unique identification number for a node; the type is a JSON datatype specifier; the name is a user configurable JSON node name if the node is an object, and the value is a JSON node value if the node is not an array.

16. The system of claim 15 wherein the JSON adapter reads the documents using a JSON database library function, and automatically generates SQL insert statements into the documents to convert each document into the corresponding row of the SQL database table.

17. The system of claim 16 wherein the JSON adapter inflates by using a JSON database library function to back-convert each corresponding row of the SQL database table into a live Javascript data object for a corresponding document or sub-document of the JSON document tree.

18. A method comprising:
creating a JSON-style table in a SQL database;
writing a JSON document to the database by deflating the JSON document and executing a single insert query to write the entire JSON document to the database in this single query; and
reading the JSON document by executing a select query to request the document by its identifier (id), wherein the select query reads an entire JSON document sub-tree from the database, and inflating the JSON rows returned by the database into the JSON document.

19. The method of claim 18 further comprising defining a schema for the JSON-style table, wherein the schema comprises an ID, path, type, name, and value; wherein the ID is a unique identification number for a node; the type is a JSON datatype specifier; the name is a user configurable JSON node name if the node is an object, and the value is a JSON node value if the node is not an array.

\* \* \* \* \*